(12) United States Patent
Korpiel et al.

(10) Patent No.: US 11,230,478 B2
(45) Date of Patent: Jan. 25, 2022

(54) METHOD FOR TREATING PRODUCED WATER

(71) Applicant: Veolia Water Solutions & Technologies Support, Saint-Maurice (FR)

(72) Inventors: John A. Korpiel, Wexford, PA (US); LNSP Nagghappan, Irvine, CA (US); Brad Biagini, Wexford, PA (US)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 0 days.

(21) Appl. No.: 16/769,084

(22) PCT Filed: Dec. 3, 2018

(86) PCT No.: PCT/US2018/063564
§ 371 (c)(1),
(2) Date: Jun. 2, 2020

(87) PCT Pub. No.: WO2019/112933
PCT Pub. Date: Jun. 13, 2019

(65) Prior Publication Data
US 2020/0331777 A1 Oct. 22, 2020

Related U.S. Application Data

(60) Provisional application No. 62/595,806, filed on Dec. 7, 2017.

(51) Int. Cl.
*B01D 61/04* (2006.01)
*B01D 65/08* (2006.01)
(Continued)

(52) U.S. Cl.
CPC .......... *C02F 1/441* (2013.01); *B01D 61/022* (2013.01); *B01D 61/04* (2013.01); *B01D 61/06* (2013.01);
(Continued)

(58) Field of Classification Search
CPC .... B01D 61/04; B01D 65/08; B01D 2311/12; B01D 2311/25; B01D 2311/2623; C02F 1/441; C02F 5/08
See application file for complete search history.

(56) References Cited

U.S. PATENT DOCUMENTS

| 2009/0314712 A1* | 12/2009 | Skou ...................... B01D 65/02 |
| | | 210/636 |
| 2014/0069821 A1* | 3/2014 | Marcin ..................... C02F 9/00 |
| | | 205/498 |

(Continued)

FOREIGN PATENT DOCUMENTS

| CL | 201903771 | 12/2019 | |
| WO | WO-2012175804 A1 * | 12/2012 | ............. C02F 1/006 |

OTHER PUBLICATIONS

CL Search Report dated Jan. 26, 2021 in re CL Application No. 01491-2020 filed Jun. 4, 2020.

*Primary Examiner* — Bradley R Spies
(74) *Attorney, Agent, or Firm* — Coats & Bennett, PLLC

(57) ABSTRACT

A method for treating produced water in a system for treating wastewater is disclosed. The system includes a reverse osmosis unit for removing dissolved solids. The reverse osmosis unit produces a permeate and concentrate. To reduce the fouling potential of the membranes associated with the reverse osmosis unit and/or to increase membrane lifetime and/or to increase system recovery, at least a portion of the concentrate is recycled and mixed with the wastewater stream at a point upstream of the reverse osmosis unit.

8 Claims, 5 Drawing Sheets

(51) Int. Cl.
  *C02F 1/44* (2006.01)
  *C02F 103/10* (2006.01)
  *C02F 5/08* (2006.01)
  *B01D 61/02* (2006.01)
  *B01D 61/06* (2006.01)

(52) U.S. Cl.
  CPC ............... *B01D 65/08* (2013.01); *C02F 5/08* (2013.01); *B01D 2311/04* (2013.01); *B01D 2311/12* (2013.01); *B01D 2311/25* (2013.01); *B01D 2311/2623* (2013.01); *B01D 2311/2642* (2013.01); *B01D 2317/025* (2013.01); *B01D 2321/12* (2013.01); *C02F 2103/10* (2013.01)

(56) References Cited

U.S. PATENT DOCUMENTS

2015/0344341 A1* 12/2015 Wallace .................... C02F 9/00
  210/638
2016/0009582 A1  1/2016 Heimel et al.

* cited by examiner

METHOD FOR TREATING PRODUCED WATER

RELATED APPLICATIONS

The present application is a U.S. National Stage Application of PCT Application No. PCT/US2018/063564, with an international filing date of Jun. 13, 2019. Applicant claims priority based on U.S. Patent Application No. 62/595,806 filed Dec. 7, 2017. The subject matter of these applications is incorporated herein in their entirety.

FIELD OF THE INVENTION

The present invention relates to wastewater treatment and more particularly to wastewater treatment systems and processes that employ reverse osmosis membranes.

BACKGROUND OF THE INVENTION

Reverse osmosis (RO) units are used in wastewater treatment systems to remove dissolved solids. The challenge of treating wastewater streams, such as produced water for example, with an RO unit is that even at low concentrations, organics, particularly aromatic compounds, tend to precipitate onto membrane surfaces employed in the RO units. Over time, the precipitates accumulate on the RO membranes, causing membrane fouling and degradation. In some cases at least, the higher the RO recovery rate, the higher the concentration of the aromatic compounds in the membrane feed/brine channels, and thus the higher the rate of membrane fouling and degradation. In many applications, there is a desire to maximize recovery rate in order to minimize liquid waste that is directed to a waste disposal facility. This too contributes to the fouling and degradation of the RO membranes. This fouling and degradation shortens the life of the RO membranes. It is known to address RO membrane fouling by raising the pH of the feed to the RO unit. This is generally helpful but often organic fouling cannot be completely eliminated.

Thus, there has been and continues to be a need in wastewater treatment processes that employ RO units to increase RO membrane life and/or increase recovery rates while minimizing liquid waste that requires disposal.

SUMMARY OF THE INVENTION

Wastewater treatment processes are disclosed that utilize one or more RO units that reduce RO membrane fouling or degradation and/or achieve higher system recovery rates.

One embodiment, referred to as mode 1, includes an RO feed tank and a downstream RO unit. Feed which may have been subjected to pre-treatment is directed, directly or indirectly, to the RO unit which produces a permeate and a concentrate. A portion of the RO unit concentrate is recycled to a point upstream of the RO unit. In one design, the RO concentrate is routed to the RO feed tank where it is mixed with the feed. As will be explained below, this process reduces RO membrane fouling and degradation and hence increases the life of the membrane, and moreover can increase system recovery rates.

As noted above, the partial concentrate recycle can be routed to different points upstream of the RO unit. In another embodiment, sometimes referred to as mode 2, the partial concentrate recycle is routed to a pre-treatment process, such as a chemical softening process. This enables the concentrate recycle, and particularly the organics therein, to undergo pre-treatment with the waste stream being treated. For example, the organics in the concentrate recycle may undergo co-precipitation with the chemical precipitates formed in the chemical softening process or may be adsorbed onto the surface of the chemical precipitates formed. As explained below, this process reduces organic membrane fouling and increases RO membrane life while generally increasing recovery rates of the system.

Modes 1 and 2 can be combined to yield what is referred to herein as mode 3. Here the RO concentrate recycle is split into at least two streams. In one example, one of the RO concentrate recycle streams is directed to the RO feed tank as explained above with respect to mode 1. The other RO concentrate recycle stream can be directed to an upstream pre-treatment process, such as a chemical softening process. This process also reduces RO membrane fouling potential while increasing RO recovery rates of the system as a whole.

In addition to addressing RO membrane fouling, a process for treating wastewater, particularly produced water, is disclosed that employs a first pass RO unit, a second pass RO unit, and a side stream reject recovery RO unit. This system and process aims to increase RO system recovery and at the same time decrease RO concentrate waste. First pass RO unit produces a permeate and a concentrate. The concentrate from the first pass RO unit is directed to the reject recovery RO unit, which in turn produces a permeate and a concentrate. Permeate from the reject recovery RO unit is mixed with the permeate from the first pass RO unit and directed to the second pass RO unit. Modes 1 and 2 processes can optionally be incorporated into this process to reduce RO membrane fouling and at the same time further increase RO membrane system recovery rates. For example, a portion of the concentrate produced by the reject recovery RO unit can be split into two streams. A first concentrate stream can be mixed with the concentrate from the first pass RO unit. A second concentrate stream can be directed upstream and mixed with the wastewater treatment stream being treated in a pre-treatment process, for example. Hence, in this process, recovery rates are enhanced by the side stream reject recovery RO unit and membrane fouling is reduced by recycling portions of the concentrate from the reject recovery RO unit to various points upstream of the first pass RO unit.

Other objects and advantages of the present invention will become apparent and obvious from a study of the following description and the accompanying drawings which are merely illustrative of such invention.

DESCRIPTION OF EXEMPLARY EMBODIMENT

Before discussing the specific processes shown in FIGS. 1-5, it should be noted that while the processes described herein are effective in treating produced water resulting from oil and gas exploration, these processes are also effective in treating wastewater streams in general. Thus, in some cases, the various processes disclosed herein will be discussed in the context of treating produced water. It is to be understood, however, by those skilled in the art that the same processes can be utilized for treating wastewater streams in general. Moreover, the schematic processes, depicted in FIGS. 1-5, are not intended to show every conceivable process configuration. In the end, a final wastewater treatment process will often be tailored to a specific application having specific objectives. Often wastewater processes and systems are designed to take into account the makeup of the wastewater stream being treated and the final effluent limits.

Figure 1:
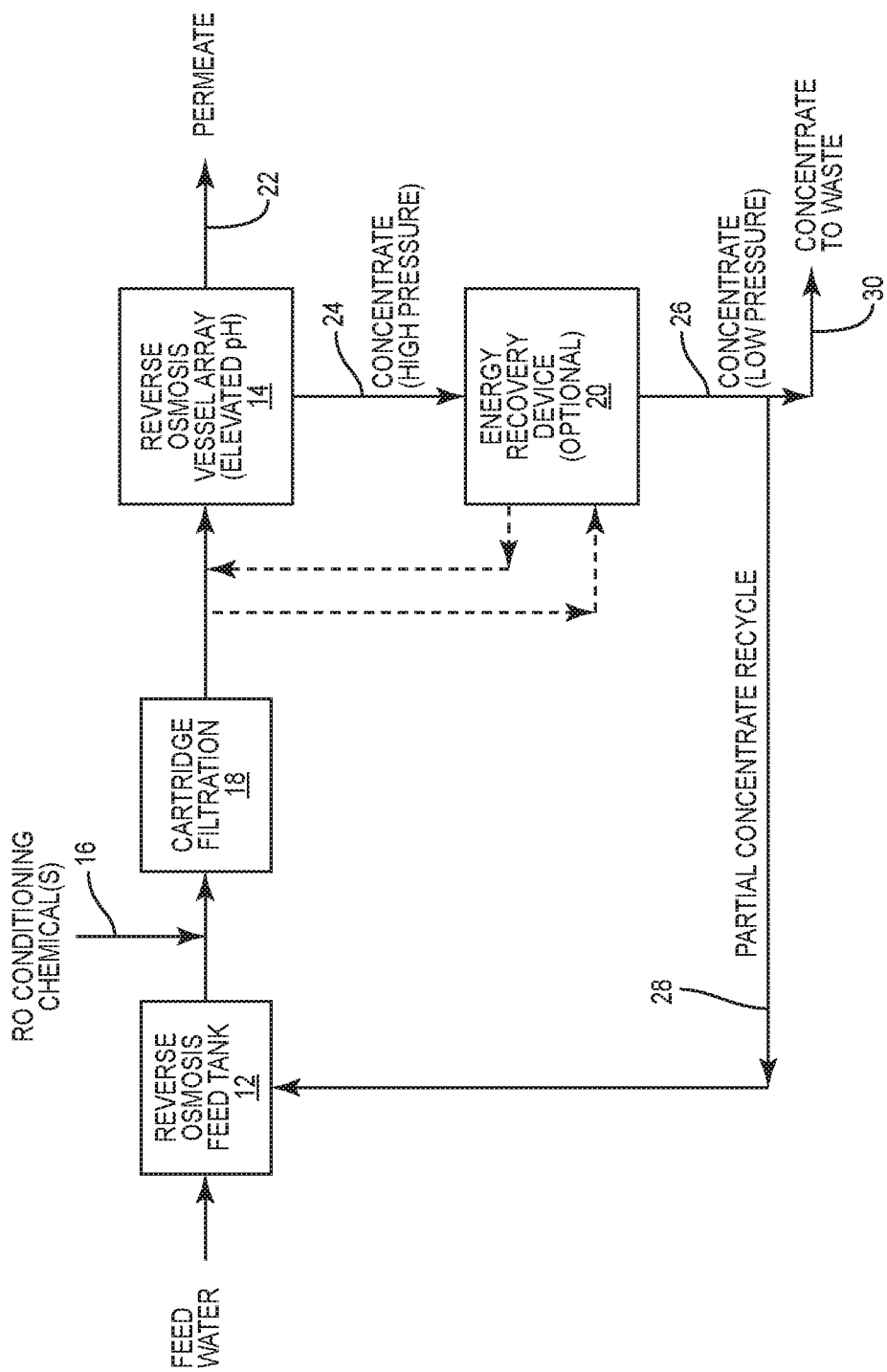
FIG. 1 is a schematic illustration of a wastewater treatment process employing an RO unit where a portion of the concentrate produced by the RO unit is recycled to an RO feed tank.

Turning to the process shown in FIG. 1, the basic components of the system employed comprise an RO feed tank 12 and an RO unit 14. RO unit 14 is referred to in FIG. 1 as a reverse osmosis vessel array. This, in FIG. 1, is a First Pass RO unit or single pass RO unit but it should be noted that an optional second pass RO may also be included in this configuration. As understood by those skilled in the art, RO unit 14 includes membranes.

The process depicted in FIG. 1 begins with a feedwater being directed into the RO feed tank 12. It is understood and appreciated by people skilled in the art that various pre-treatment processes may occur upstream of the RO feed tank 12. For example, such pre-treatment processes may include one or more of degassing, chemical softening, clarification (i.e., settling), pH adjustment, silica removal and any one of various filtration processes, such as media filtration or membrane filtration, to remove suspended solids and precipitates.

In the embodiment illustrated in FIG. 1, in addition to the RO feed tank 12 and RO unit 14, there is provided an injection site 16 for injecting RO conditioning chemicals into the feed. Downstream of the injection site 16 is a cartridge filtration unit 18 and downstream from the high pressure side of the RO unit 14 is an optional energy recovery device 20.

Feedwater in feedwater tank 12 is pumped by a low pressure feed pump (not shown) past the injection site 16. The RO conditioning chemical or chemicals are mixed with the feed. RO conditioning chemicals may include antiscalants, as well as other RO conditioning chemicals that are particularly suited for a certain application. Feedwater flows from the injection site 16 to the cartridge filtration system 18 where suspended solids are removed from the feedwater. A high pressure pump (not shown) pumps the effluent from the cartridge filtration system 18 to the RO unit 14. RO unit 14 produces a low pressure permeate 22 and a high pressure concentrate 24. The pressure of the concentrate produced by the RO unit 14 can vary but typically ranges from about 400-1200 psig depending on the application. As an option, the energy recovery device 20 is utilized to recover a substantial part of the pressurized energy from the RO concentrate 24. Due to the recovery (and transfer) of this energy, the concentrate effluent from the energy recovery device 20 is typically in the range of about 15-30 psig. Recovered energy by the energy recovery device 20 is then utilized to decrease the energy consumption of the RO high pressure feed pump that feeds the RO unit 14.

Low pressure concentrate 26 flowing from the energy recovery device 20 is split into two streams, a partial concentrate recycle 28 and a concentrate waste stream 30. The partial concentrate recycle 28 is directed back to the RO feed tank 12 and mixed with the influent feedwater.

There are various ways to employ the partial concentrate recycle 28. The approach shown in FIG. 1 and described here is referred to as mode 1. In mode 1, the RO unit 14 is a single pass RO unit and is purposely designed to operate at a low "skid recovery". The term "skid recovery" is the recovery across RO unit 14 (i.e., the flow rate of stream 22 divided by the summation of the flow rates of the two streams 22 and 24). In a typical case, this low skid recovery is in a range of 30-50%, depending on the particular application. Yet, it is contemplated that this approach achieves a high overall system recovery, typically in the range of 85-95%, depending on the application. The term "system recovery" is the recovery across the whole system shown in FIG. 1 (i.e., the flow rate of stream 22 divided by the summation of the flow rates of the two streams 22 and 30). This result is achieved by the use of the partial recycle of the RO concentrate. To achieve these results, a high rate of concentrate recycle is selected. The high rate of concentrate recycle is determined in order to achieve the following criteria:

flux rate of the RO unit that is less than or equal to a target flux rate that is application specific.

an RO unit concentrate flow rate that is greater than or equal to a target flow rate that is application specific.

Mode 1's partial RO concentrate recycle rate allows the RO system to independently control the RO unit flux, permeate recovery, as well as the cross-flow velocity, across the membranes employed in the RO unit 14. This enables the system to operate at a low flux rate which is defined as below a critical flux associated with accelerated membrane fouling, while simultaneously achieving an adequate high cross-flow velocity in the RO membrane feed channels. Expressed in another way, this approach provides sufficient turbulence to minimize the concentration boundary layer on the RO membrane surface to reduce or minimize organic fouling potential. Another advantage of partial RO concentrate recycle is that it facilitates a more uniform flux distribution across the membranes in a given RO pressure vessel (i.e., a less steep decrease in permeate flux from the lead-end element to the tail-end element in a given vessel, which minimizes the potential for overburdening the lead-end element with an excessive permeate flux rate). The partial recycle of the RO concentrate reduces the volume of liquid waste that requires disposal. Thus, the combination of a low flux rate with high cross flow velocity across the surface of the RO membranes serves to reduce the rate of membrane fouling or degradation and hence increases membrane life. At the same time, this can also achieve a high RO system recovery rate.

This mode 1 process uses concentrate recycle that is external to the RO unit 14. RO concentrate recycle in mode 1 is diluted with incoming feedwater. Incoming feedwater has a lower total dissolved solids and organic concentration than the recycled concentrate. This reduces the potential for organic precipitation. This also means that the diluted RO concentrate is reprocessed through the chemical injection site 16 and cartridge filtration unit 18 each time it is recycled. This enables the RO fouling potential to be controlled compared to internal concentrate recycle processes.

Figure 2:
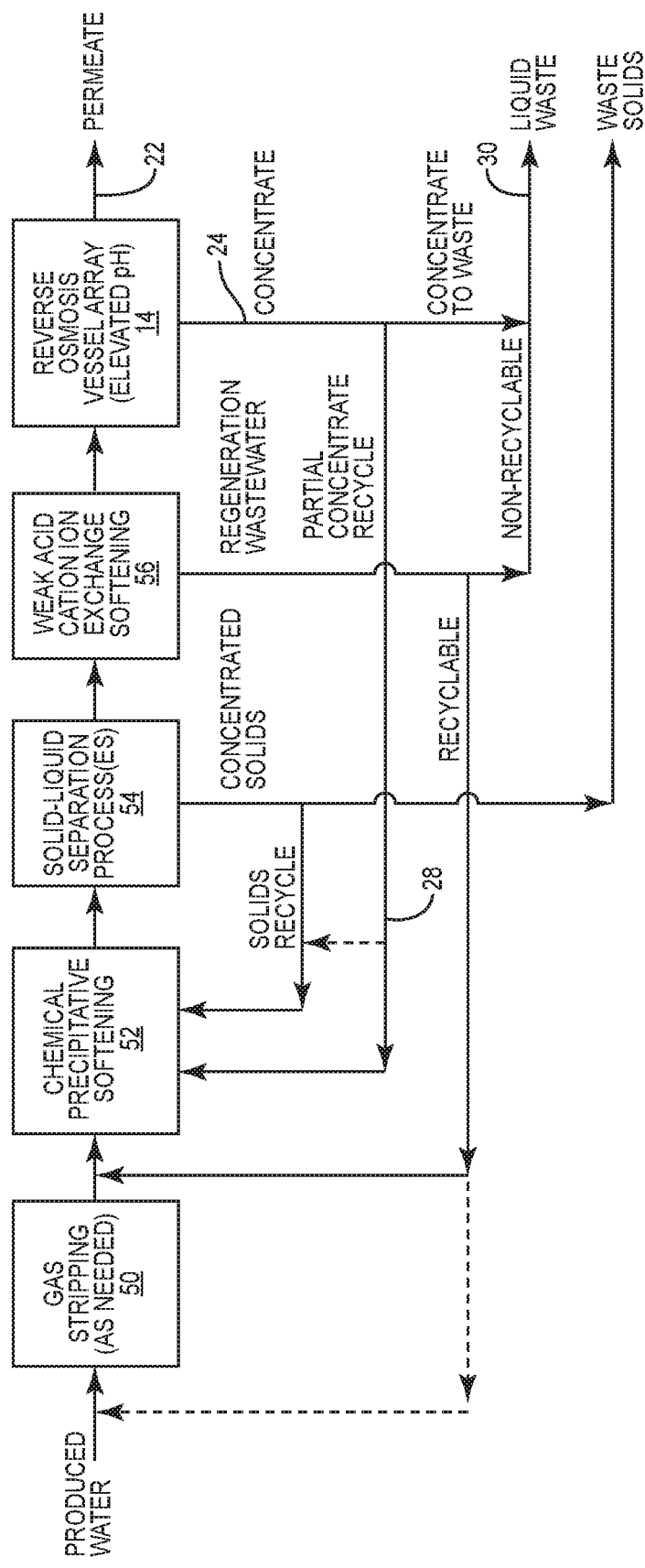
FIG. 2 is a schematic illustration of a wastewater treatment process employing an RO unit where a portion of the concentrate produced by the RO unit is recycled to an upstream pre-treatment process.

FIG. 2 shows another embodiment of the present invention. FIG. 2 shows another process where RO concentrate recycle is used to reduce RO membrane fouling and increased RO system recovery rates. RO concentrate recycle approach, in the case of FIG. 2, is referred to as mode 2. In this case, the wastewater treatment system, as a whole, differs slightly from that depicted in FIG. 1. Upstream of the RO unit 14 is a degasser 50. Degasser 50 is optional. Downstream of the degasser 50 is a chemical softening unit 52. Downstream of the chemical softening unit 52 is a solids-liquid separator(s) 54 which people skilled in the art appreciate can assume various forms, such as a clarifier, membrane separation, media filter unit, etc. In a preferred embodiment, the solids-liquid separation process is carried out by a high rate clarifier followed by a membrane separation unit such as a ceramic ultrafiltration membrane unit. Effluent from the solids-liquid separator(s) 54 is directed to a weak acid cation exchange 56 which, in this case, forms a hardness polishing process.

Again, the process elements shown in FIG. 2 are exemplary systems and processes upstream of the RO unit 14 and can vary. Thus, not all of the components shown in FIG. 2 may be required to execute the invention. Moreover, the process elements expressed in FIG. 2 are not exhaustive. There can be other process elements incorporated into the total process.

In any event, like the FIG. 1 embodiment and the process of mode 1, RO unit 14 produces a low pressure permeate 22 and a high pressure concentrate 24. High pressure concentrate 24 is split into two low pressure streams, one being the RO concentrate recycle 28 and the other being the concentrate waste 30. More particularly, in one embodiment, the high pressure concentrate is generally first throttled down to low pressure by using a concentrate flow control valve and then the low pressure concentrate is split into the two low pressure streams. The principal difference in the process depicted in FIG. 2, as compared to the process of FIG. 1, is that in the FIG. 2 embodiment the RO concentrate recycle 28 is directed to a pre-treatment process upstream of the RO unit 14. One purpose of directing the RO concentrate recycle 28 to a pre-treatment process is to remove organics from the RO concentrate recycle. By removing organics from the RO concentrate recycle, it follows that membrane fouling potential is reduced. The particular approach, shown in FIG. 2, is to direct the RO concentrate recycle 28 to the chemical softening unit 52. Here the organics in the RO concentrate can undergo co-precipitation with the chemical precipitates being formed in the chemical softening unit 52. Also, organics in the RO concentrate recycle can be removed through an adsorption mechanism. That is, certain organics in the RO concentrate recycle may be adsorbed onto the surfaces of chemical precipitates formed in the chemical softening unit 52. Thus, a portion of the elevated organics in the RO concentrate recycle are destabilized and removed with the softening sludge to reduce the extent to which these membrane-fouling organics "cycle up" in the process. Furthermore, mode 2 increases RO system recovery by recycling a portion of the RO concentrate. But the mode 2 process predominantly uses organic destabilization/adsorption to control RO fouling rate and increase membrane life. This is to be contrasted with mode 1 which uses high cross-flow velocity across the RO membrane and low flux, achieved by high rate concentrate recycle to reduce RO membrane fouling.

Figure 3:
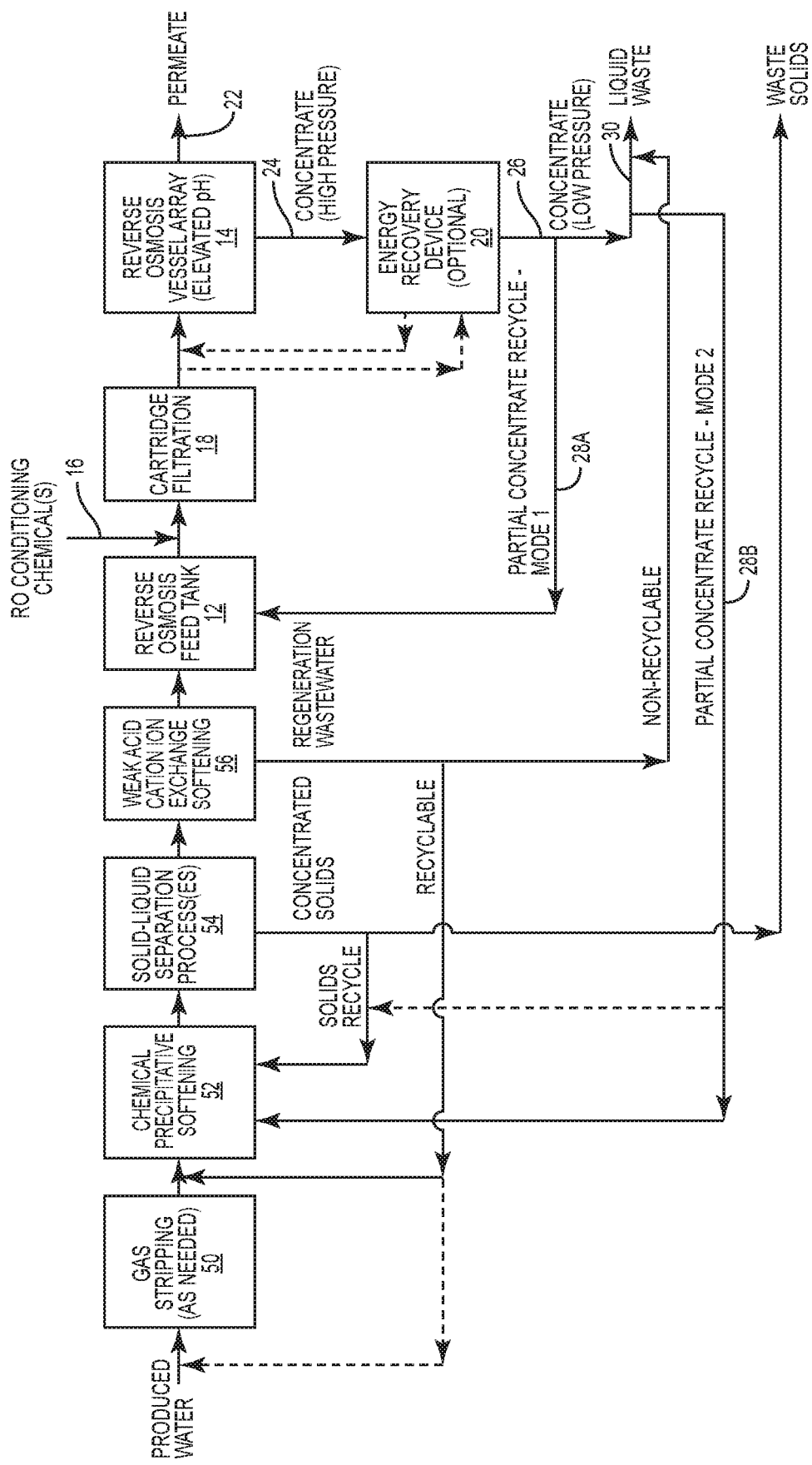
FIG. 3 is a schematic illustration of a wastewater treatment process that combines the partial concentrate recycling processes depicted in FIGS. 1 and 2.

FIG. 3 shows a wastewater treatment process that combines modes 1 and 2 (i.e. the processes shown in FIGS. 1 and 2). Here the RO unit 14 produces a concentrate that is split into two partial concentrate recycle streams 28A and 28B. Also, the concentrate produced by the RO unit 14 is split into a third stream, a concentrated waste stream 30. As seen in FIG. 3, the partial concentrate recycle stream 28A is directed to the RO feed tank 12. The partial concentrate recycle stream 28B is directed (directly or indirectly) to the chemical softening unit 52. By combining modes 1 and 2, the advantage of each is realized in one system and process.

Figure 4:
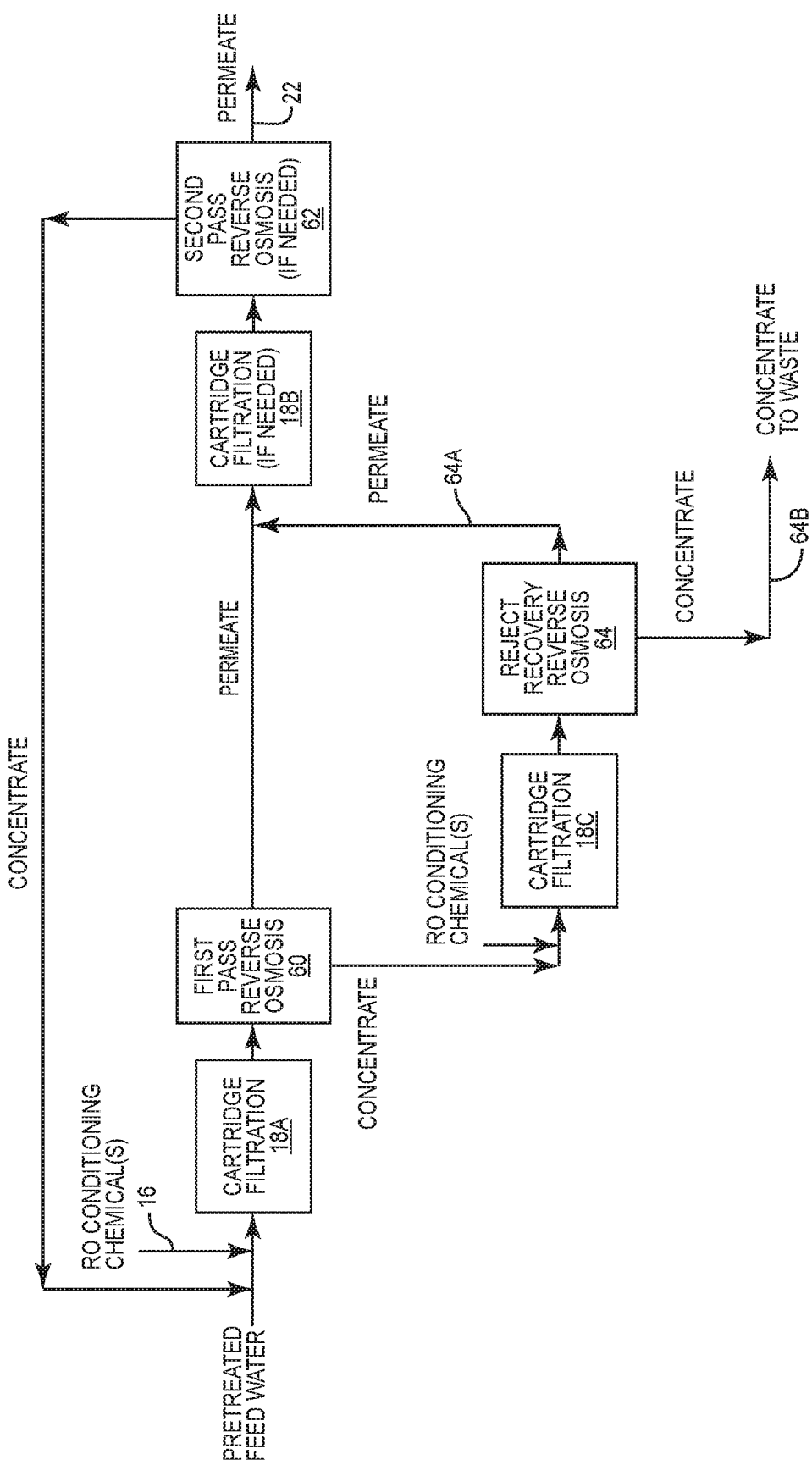
FIG. 4 is a schematic illustration of a wastewater treatment process that employs a first pass RO unit, a second pass RO unit, and a side stream reject recovery RO unit for treating the concentrate from the first pass RO unit.

Turning to FIG. 4, shown therein is a wastewater treatment system and process that includes a side stream RO reject recovery process. Note in the process of FIG. 4 there is a first pass RO unit 60 and a second pass RO unit 62. It is noted that the second pass RO unit 62 is deemed optional and may not be required in all applications. The system and process of FIG. 4 includes two main stream cartridge filter units 18A and 18B. Cartridge filter 18B is optional. With respect to the side stream, note that there is a third cartridge filter, cartridge filter unit 18C. In addition, in the side stream there is a reject recovery RO unit 64. Reject recovery RO unit 64 produces a permeate 64A and a concentrate 64B.

As indicated in FIG. 4, the pre-treated feed water is typically received in a feed tank (not shown for simplicity) in which it is combined with the recycled concentrate from the Second Pass RO (if needed and applicable). The combined feed (i.e., incoming pretreated feed water plus recycled Second Pass RO concentrate) is then pumped via a low pressure feed pump (not shown for simplicity) and treated via the addition of RO conditioning chemicals (antiscalant or any other specialty chemicals as needed for the application). The conditioned feed water is then filtered by cartridge filtration. The cartridge filtered water is then boosted in pressure by a high pressure pump (not shown for simplicity) and fed to the First Pass RO unit 60 (First Pass RO) which generates a clean water permeate stream (low pressure) and a high pressure concentrate stream (ranging from 400 to 900 psig depending on application). The First Pass RO unit 60 typically operates at 75 to 80% recovery.

The concentrate from the First Pass RO (unit 60) is collected in a Recovery RO Feed Tank (not shown for simplicity) and is then pumped via a low pressure feed pump (not shown for simplicity) and treated via the addition of RO conditioning chemicals (antiscalant or any other specialty chemicals as needed for the application). The conditioned feed water is then filtered by cartridge filtration unit 18c. The cartridge filtered water is then boosted in pressure by a high pressure pump (not shown for simplicity) and fed to the Reject Recovery RO unit 64 which generates a clean water permeate stream (low pressure) and a high pressure concentrate stream (ranging from 800 to 1200 psig depending on application). The Recovery RO unit 64 typically increases the overall RO system recovery by 5 to 15%.

The permeates from the First Pass RO unit 60 and Reject Recovery RO unit 64 are combined together in a tank (not shown for simplicity). If necessary to achieve the treated water quality requirements, the combined permeate is treated via the Second Pass RO unit 62. The combined permeate is pumped via a low pressure feed pump (not shown for simplicity) and treated via the addition of RO conditioning chemicals (if necessary). The conditioned feed water is then filtered by cartridge filtration unit 18B. The cartridge filtered water is then boosted in pressure by a high pressure pump (not shown for simplicity) and fed to the Second Pass RO unit 62 which generates a clean water permeate stream (low pressure) and a high pressure concentrate stream (ranging from 150 to 400 psig depending on application). RO unit 62 typically operates at 88 to 92% recovery. The concentrate from Second Pass RO unit 62 is recycled to the First Pass RO unit 60 system for re-processing.

The use of the Reject Recovery RO concept illustrated in FIG. 4 is independent of the use of Mode 1 and/or Mode 2 partial concentrate recycle that is illustrated in FIGS. 1, 2, and 3. The Reject Recovery RO unit 64 can be utilized without partial concentrate recycle (Mode 1 or Mode 2) of First Pass RO or Reject Recovery RO concentrates, as indicated in FIG. 4. Or, Reject Recovery RO unit 64 can be utilized with Mode 1, Mode 2, or a combination of Mode 1 and Mode 2 partial concentrate recycle. The Mode 1, Mode 2, or combined Mode 1 and 2 partial concentrate recycle can be utilized on the First Pass RO concentrate, the Reject Recovery RO concentrate, or both.

Figure 5:
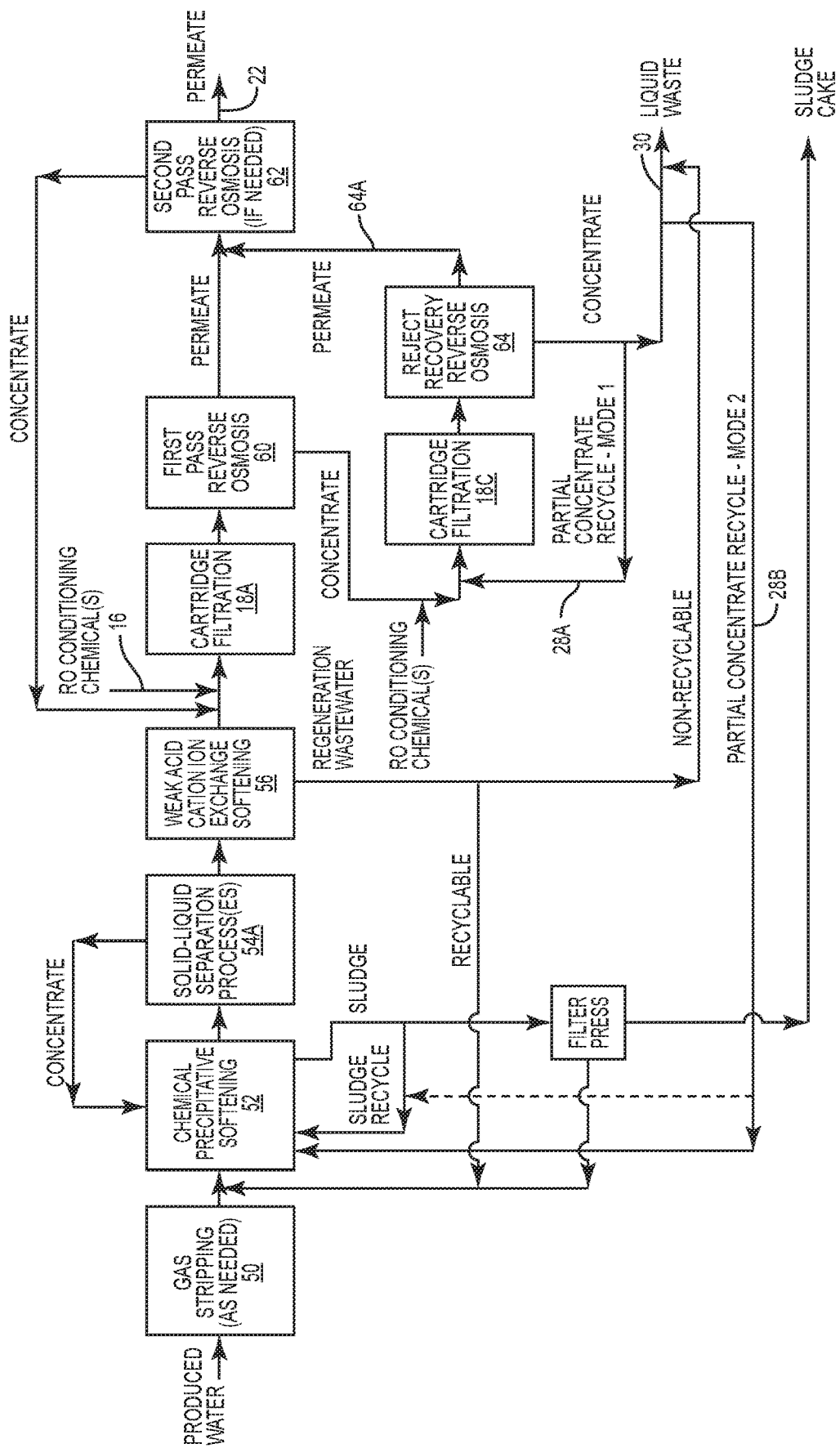
FIG. 5 is a schematic illustration of a wastewater treatment process that combines the process features of FIGS. 1, 2 and 4.

FIG. 5 shows a process where the modes 1 and 2 processes (shown in FIGS. 1 and 2) are integrated into the process of FIG. 4. Like other processes discussed above, FIG. 5 depicts a produced water process but it is understood and appreciated by those skilled in the art that the FIG. 5 process can be employed to treat other wastewater streams. For simplicity, FIG. 5 does not show feed tanks, pumps, some chemical injection sites, energy recovery devices, or other auxiliary equipment that might be appropriate for specific applications.

An example of how the process of FIG. 5 is implemented in a produced water application is shown in FIG. 5. Consistent with the foregoing discussion, the process configuration illustrated in FIG. 5 can be utilized in the treatment of high fouling produced water where high overall system recovery (i.e., low liquid waste generation) is required to either (1) reduce the customers cost of disposal of liquid waste (via deep-well injection or hauling the liquid waste offsite); or (2) enable operation in a gas or oil field within the constraints of injection well capacity limitations.

Overall system recovery is defined as the daily influent produced water feed volume minus daily liquid waste volume, divided by daily influent produced water feed volume. Liquid waste volume does not include dewatered chemical sludge or any water that is lost from the system via evaporation. That is, overall system recovery is only penalized by the liquid waste required to be deep-well injected or hauled offsite. For example, a system treating 50,000 barrels per day of produced water at 90% overall system recovery will have a daily liquid waste volume that is equal to 10% of the feed flow rate or 5,000 barrels per day.

For this example, assume that the system and process of FIG. 5 is operated based on the following parameters:
Produced water flow rate being treated by the process is 50,000 barrels per day.
Liquid waste limitation is deemed to be 5,000 barrels per day in order to meet an overall system recovery of 90%.
Liquid waste volume (non-recyclable) from the cation exchange softening regeneration is assumed to be 306 barrels per day.
Liquid waste limitation on reject recovery RO concentrate flow rate is 5,000 minus 306, which equals 4,694 barrels per day.

In order to limit the reject recovery RO concentrate flow rate to 4,694 barrels per day, the RO system recoveries of the individual RO units must be selected. For this example, the first pass RO unit 60 recovery is selected at 78% and the second pass RO unit 62 recovery is selected at 90%. These values represent typical recovery values and are selected for this specific example based on experience. It is understood and appreciated by those skilled in the art that these values can vary by approximately +1-5% recovery depending upon application-specific factors that are considered, such as water chemistry, water temperature, fouling characteristics, sizing of available standard equipment and other factors. The recovery of the reject recovery RO unit 64 is then determined via an iterative mass balance so as to limit the quantity of RO concentrate "wasted" to 4,694 barrels per day in order to achieve a 90% overall system recovery.

The reject recovery RO unit 64 inherently is subjected to the most challenging process conditions because the produced water is already pre-concentrated with dissolved salts and dissolved organic compounds in the feed to the reject recovery RO unit. In this example, with the first pass RO unit 60 operating at 78%, the feed to the reject recovery RO unit 64 is approximately 4.5 times more concentrated than the feed to the first pass RO unit 60. Thus, a combination of mode 1 and mode 2 partial concentrate recycle is utilized in conjunction with the appropriate sizing of the reject recovery RO unit 64. That is, in considering the size of the reject recovery RO unit 64, one considers the number of stages, pressure vessels per stage, and membranes per pressure vessel. All of this in this particular example is considered for the purpose of accomplishing the following:

Limit the permeate flux of the reject recovery RO unit 64 to 7 gfd or less. This is determined via application-specific piloting and/or via experience after assessing fouling potential of the produced water and project economics. The lower the permeate flux, the lower the membrane fouling rate tends to be, subject to diminishing returns. Selecting too low of a permeate flux can adversely affect the project economics, particularly equipment and membrane cost and can also impact the permeate water quality.

Maintain the concentrate flow rate of the reject recovery RO unit 64 to 24 gpm per vessel or greater to insure adequate cross-flow velocity. Again, this is determined based on application-specific piloting and/or through experience after assessing fouling potential of the produced water and project economics. The higher the concentrate flow rate of the reject recovery RO unit 64, the higher the turbulence through the membrane feed/brine channels and thus the lower the membrane fouling rate tends to be, again subject to diminishing returns. Selecting too high of a concentrate flow rate can adversely affect project economics, such as pump cost sand energy consumption, as well as the permeate water quality.

Maintaining an overall system recovery of 90% by limiting the wasted concentrate to 4,694 barrels per day.

"Skid recovery" is defined as the permeate flow of the reject recovery RO unit 64 divided by the actual feed flow to the reject recovery RO unit 64. The actual feed flow to the reject recovery RO unit 64 is the sum of the incoming concentrate flow from the First Pass RO unit 60 plus the Mode 1 partial concentrate recycle. The skid recovery of the reject recovery RO unit 64 is maintained at only 34% in this example via mode 1 partial concentrate recycle in order to maintain a concentrate flow of at least 24 gpm per vessel. In this example, 54% of the concentrate stream produced by the reject recovery RO unit 64 (6,900 barrels per day) is recycled to the feed tank supplying the reject recovery RO unit as mode 1 partial concentrate recycle to achieve the 34% skid recovery, as per the process configuration shown in FIG. 1. After accounting for the mode 1 partial concentrate recycle, the reject recovery RO unit system recovery is maintained at 53%.

This example also uses mode 2 partial concentrate recycle, as shown in FIG. 5, to further increase the overall recovery and to further reduce the daily volume of concentrate waste from the system. Of the remaining concentrate of the reject recovery RO unit 64 that is not recycled in mode 1, a portion is further recycled to the chemical softening unit 52 as mode 2 partial concentrate recycle. In this example, the mode 2 partial recycle is 1,173 barrels per day. The remaining concentrate produced by the reject recovery RO unit 64 of 4,694 barrels per day is wasted from the system to either deep-well injection or off-site disposal. Thus, the total liquid waste volume, after accounting for 306 barrels per day of non-recyclable weak acid cation exchange softening regeneration waste is 5,000 per day.

It should be noted that mode 2 partial concentrate recycle is a more extreme version of mode 1 recycle in that the concentrate is recycled further upstream in the process such that the concentrated organic compounds in the concentrate have an opportunity to be partially removed in the chemical softening process via adsorption onto suspended solids or to co-precipitate with chemical precipitates being formed, such as calcium carbonate and magnesium hydroxide solids. Mode 2 recycle is judicially and wisely used to avoid oversizing the pre-treatment system which can unreasonably increase capital costs and operating costs. In this example, the mode 2 partial concentrate recycle flow of the 1,173 barrels per day is selected based on the reduction of the RO concentrate wasted rate by 20%.

In this example, mode 2 recycle increases the overall system recovery by 2% and also increases the flow rate through the pre-treatment system by 2%. If mode 2 is not utilized, mode 1 recycle can be utilized alone to achieve a similar overall system recovery. However, if mode 2 is not utilized, the additional removal mechanisms that are associated with mode 2 recycle are forfeited.

In this example, the reject recovery RO unit 64 is selected as a single stage system consisting of 15 vessels (8-inch diameter) in parallel and 7 membranes per vessel. Based on the selected array sizing and the mode 1 and mode 2 partial concentrate recycle rates described above, the minimum 24 gpm concentrate flow per vessel and maximum 7 gfd permeate flux are maintained with the selected reject recovery RO unit 64.

The present invention also entails an automatic RO flushing sequence using RO permeate. In particular, intermittent automatic RO flushing with RO permeate is an enhancement feature to reduce the rate of RO fouling by allowing the RO membranes to momentarily contact clean RO permeate while the RO skid is offline. Unlike conventional permeate flushing that is commonly used in RO systems for protecting the membranes while the RO unit is offline (shutdown) for a prolonged period, the automated permeate flushing sequence described here is done at regularly occurring intervals, albeit for short durations, as a planned brief interruption to the RO production process. The purpose of the automated permeate flushing sequence is to allow the RO membranes to have momentarily relief from the normal high pressure conditions in which the membranes are in contact with highly concentrated brines of high organics concentration, in order to reduce the rate of accumulation of foulants on the membrane surface. During the permeate flushing, the RO unit is taken offline and is fed with low pressure RO permeate that is flushed through the membrane feed/brine channels to purge out the highly concentrated brine and to allow the membranes to momentarily contact clean RO permeate as a brief (but regular) relaxation mode. The resulting disruption (disequilibrium) of the concentration boundary layer at the membrane surface causes foulants to de-sorb from the membrane surface and re-dissolve into the clean permeate solution. Thus, the automated flushing sequence functions as a non-chemical miniature clean-in-place step. In order to maximize system recovery, the initial flush waste in the concentrate will be wasted for disposal while subsequent clean flush in the RO reject is recycled to the RO feed tank. The automated permeate flush sequence may also utilize an optional soak step to conserve permeate water while allowing the membranes to contact clean RO permeate for an additional duration.

An additional feature is to periodically inject a conditioning chemical known as a surfactant into the flush water supply, i.e. the RO permeate, on an intermittent batch basis as part of the permeate flush sequence. The surfactant forms micelles that sequester the hydrophobic organic foulants that have accumulated on the membrane surface over time. This enables the foulants to de-sorb from the membrane surface and re-dissolve into the clean permeate solution during the permeate flush sequence. Using the piping and valving associated with concentrate recycle, the chemically conditioned flush water used in the permeate flush sequence can be recirculated through the RO skid at low pressure (100% recovery) while the RO skid is offline, similar to a clean-in-place operation. The membranes may then soak in the chemically conditioned flush water in their downtime to enable foulants that have accumulated on the membrane surface over time to re-dissolve into solution in the form of micelles, thus reactivating the RO membranes.

In addition, a conditioning chemical known as a surfactant can be added continuously to the RO feed water to control organic fouling of the RO membranes by maintaining organic compounds in solution. The surfactant forms micelles that sequester hydrophobic organic foulants so that the foulants remain in solution in the water phase rather than attaching to and accumulating on the membrane surface. Alternatively, this can be accomplished by intermittently injecting on a batch basis the chemical conditioner into the RO flush water with recirculation and/or soaking steps as described above while the RO skid is offline. The unbound chemical conditioner injected into the RO permeate quality water will be more active in the formation of micelles to sequester organics that tend to foul the RO membranes and could reverse some of the fouling that has already occurred.

The wastewater treatment process described herein includes an embodiment where a substantial portion of the ion exchange regeneration waste stream is recycled to the head or to a selected portion of the wastewater treatment process for treatment. This tends to minimize or reduce the amount of liquid waste directed to a liquid waste disposal facility.

As discussed above, some of the embodiments shown in the drawing include a weak acid cation (WAC) softener 56 (see FIGS. 2, 3, and 5) for removing hardness from the wastewater stream. From time to time, the WAC softener utilized in the processes becomes exhausted. That is, over a period of time the hardness leakage from the WAC softener is greater than a predetermined end point concentration and the resin bed of the WAC softener must be regenerated. Regeneration can be performed at various times or at fixed time intervals based on a predetermined volume of wastewater that has been treated.

In one embodiment, the WAC softener regeneration involves the following steps, listed in sequential order:

(1) Backwash. To regenerate the resin bed, a backwash process is performed to remove accumulated particulate matter that may have collected at the top of the bed and also to relieve compaction. During the backwash cycle, the feedwater flows up through the resin bed in a reverse direction relative to the normal service flow. The resin in the WAC softener is fluidized by the backwash flow and typically achieves about 20-50% expansion. This allows the particulate matter in the resin to be washed away and discharged from the WAC softener.

(2) Acid injection. After backwash, a dilute hydrochloric acid is added to the softener vessel through a down flow regenerant header located above the resin bed. The function of the dilute hydrochloric acid is to remove hardness and metals from the resin bed and return it to a hydrogen form. Dilute hydrochloric acid flows through the resin bed and out of the strainers located in a false bottom at the bottom of the resin bed. Thereafter, the dilute hydrochloric acid exits the vessel. During acid injection, the acid regeneration reactions are as follows as a sufficient amount of dilute acid flows through the resin bed to displaced calcium or magnesium from the resin, converting the resin to hydrogen form:

$$(RCOO)_2Ca + 2HCl \rightarrow 2RCOOH + CaCl_2$$

$$(RCOO)_2Mg + 2HCl \rightarrow 2RCOOH + MgCl_2$$

(3) Acid rinse. The acid rinse is also known as acid displacement. Acid is displaced from the resin bed with a relatively slow flow of water.

(4) Caustic injection. A dilute caustic soda is added to the WAC softener through the strainers located in the false bottom at the bottom of the bed to convert the resin into a sodium form. Dilute caustic soda flows upwardly through the resin bed and flows out of the vessel through the regenerant header located above the bed. During the caustic injection, the caustic regeneration reaction is as depicted below as a sufficient amount of the dilute caustic flows through the resin bed to convert the resin from the hydrogen form to the sodium form, while neutralizing the residual acidity from the previous step:

$$RCOOH + NaOH \rightarrow RCOONa + H_2O$$

It is appreciated that at the beginning of the caustic injection step, the waste stream being discharged from the softener is initially acidic. However, the pH of the waste stream will rise, sometimes abruptly, to the range of 10.5-12 once excess caustic soda starts to break through.

(5) Caustic rinse. The caustic rinse is also known as caustic displacement. Through the caustic rinse, caustic is displaced from the resin bed with a slow flow of water.

(6) Fast rinse. The bed is allowed to settle and is then rinsed with feedwater to remove all the traces of regenerant chemicals left in the vessel after displacement. The fast rinse mode is the same as the service mode, except the water is sent to waste instead of to service. After the fast rinse cycle, the WAC softener 56 is returned to normal service.

In typical wastewater treatment processes of the type shown in FIGS. 2, 3 and 5, only the backwash and fast rinse streams that do not contain residual regeneration waste chemicals are typically recycled to the front of the wastewater treatment process. Regeneration waste streams containing residual chemicals (acid injection, acid rinse, caustic regeneration and caustic rinse) are typically sent to liquid waste disposal facilities rather than being recycled.

However, in one embodiment of the processes shown in the drawings and discussed above, a portion of the caustic injection waste stream, as well as the caustic rinse waste streams, are recycled to achieve a number of benefits. First, by recycling these waste streams, there is an improvement in the system recovery by reducing the volume of liquid waste that is otherwise sent to a disposal facility. The liquid waste from the caustic injection and caustic rinse steps are recycled and reprocessed to the maximum extent possible, in one embodiment, to maximize overall system recovery. Another benefit is that by recycling the streams, it is possible to recover the alkali (excess caustic) from the regeneration waste and recycle the recovered alkali to the front of the treatment process, resulting in less fresh caustic soda being required in the upstream chemical softening process. This reduces chemical demand and chemical operating costs.

As alluded to above, since the caustic injection waste stream is initially acidic before rising to an alkaline pH greater than 10, the initial portion of the caustic injection waste stream is sent to a liquid waste disposal facility. Once the pH of the caustic injection waste stream rises above the desired pH set point, the caustic injection waste stream is then recycled to the front of the treatment process. Depending on the priority of the particular waste treatment process (i.e. maximizing recovery or reducing chemical demand for softening) the pH set point which triggers recycling of the caustic injection waste stream may be adjusted.

Note FIG. 3, for example. In this process, the regeneration waste stream leaving the weak acid cation ion exchange softening unit 56 is divided into a recyclable stream and a non-recyclable stream. Note that the recyclable stream is directed, in the case of one embodiment, to a point upstream of the chemical precipitative softening unit 52. The non-recyclable stream is directed away from the process and to what is referred to as "liquid waste". The recyclable portion of the WAC softener regeneration waste (backwash, fast rinse, the alkaline portion of the caustic injection step, and the caustic rinse waste) is recycled to the front of the process where it is reprocessed by the treatment system. The non-recyclable portion of the regeneration waste (acid injection, acid rinse waste and the initial acidic portion of the caustic injection waste stream) is sent to a liquid waste disposal facility. The present invention may, of course, be carried out in other specific ways than those herein set forth without departing from the scope and the essential characteristics of the invention.

Throughout the specification, the method or process refers to removing certain contaminants such as particulates (oil, suspended solids, bacteria), scale formers (calcium, magnesium, silica, iron, barium, strontium) and dissolved gases (carbon dioxide, hydrogen sulfide, and volatile organic compounds). The term "removing" or "removed" means "reducing" or "reducing the concentration of a particular contaminant".

The present embodiments are therefore to be construed in all aspects as illustrative and not restrictive and all changes coming within the meaning and equivalency range of the appended claims are intended to be embraced therein.

What is claimed is:

1. A method of treating produced water with a reverse osmosis (RO) unit that includes membranes and in the process of treating the produced water, reducing RO membrane fouling, the method comprising:
   pretreating the produced water and wherein pretreating the produced water comprises:

chemically softening the produced water in a chemical softening unit to remove hardness and producing precipitants;

removing the suspended solids and precipitants from the produced water through one or more solid-liquid separation processes;

after removing the suspended solids and precipitants from the produced water, removing residual hardness from the produced water in an ion exchange unit;

directing the produced water from the ion exchange unit directly or indirectly to an RO unit and removing dissolved solids from the produced water in the RO unit and producing a permeate stream and a concentrate stream;

splitting the concentrate stream into first, second and third streams;

wasting the third stream;

recycling the first stream to the RO unit or to a point between the ion exchange unit and the RO unit and mixing the first stream with the produced water; and recycling the second stream to the chemical softening unit and processing the second stream in the chemical softening unit.

2. The method of claim 1 comprising reducing the accumulation of foulants on at least some of the membranes by intermittently flushing at least some of the membranes with the permeate stream which causes foulants on the membranes to desorb from the membranes and dissolve in the permeate stream.

3. The method of claim 2 including injecting a surfactant into the permeate stream where the surfactant forms micelles that sequester the foulants accumulated on the membranes.

4. The method of claim 2 including injecting a surfactant into the produced water upstream of the RO unit where the surfactant forms micelles that sequester the foulants so that the foulants remain in solution in the produced water rather than attaching to the membranes.

5. The method of claim 2 including regenerating the ion exchange unit and producing a regeneration waste stream and recycling the regeneration waste stream to the chemical softening unit.

6. The method of claim 2 including regenerating the ion exchange unit by injecting acid and then caustic soda into the ion exchange unit and producing a caustic injection waste stream and directing a caustic rinse through the ion exchange unit and producing a caustic rinse waste stream; and recycling both an alkaline portion of the caustic injection waste stream and the caustic rinse waste stream to a point upstream of the ion exchange unit for processing.

7. A method of treating produced water with a reverse osmosis (RO) unit that includes membranes and in the process of treating the produced water, reducing RO membrane fouling, the method comprising:

pretreating the produced water and wherein pretreating the produced water comprises:

chemically softening the produced water in a chemical softening unit to remove hardness and producing precipitants;

removing the suspended solids and precipitants from the produced water through one or more solid-liquid separation processes;

after removing the suspended solids and precipitants from the produced water, removing residual hardness from the produced water in an ion exchange unit;

directing the produced water from the ion exchange unit directly or indirectly to an RO unit and removing dissolved solids from the produced water in the RO unit and producing a permeate stream and a concentrate stream;

splitting the concentrate stream into first, second and third streams;

wasting the third stream;

recycling the first stream to the RO unit or to a point between the ion exchange unit and the RO unit and mixing the first stream with the produced water;

recycling the second stream to the chemical softening unit and processing the second stream in the chemical softening unit;

wherein the ion exchange includes a resin for removing residual hardness from the produced water;

from time-to-time, regenerating the resin in the ion exchange by the following steps in sequence:

backwashing the resin in the ion exchange by fluidizing the resin and removing accumulated particulate matter from the resin, resulting in a backwashing waste stream;

injecting an acid into the ion exchange unit and contacting the resin with the acid and removing hardness and metals from the resin and returning the resin to a hydrogen form;

rinsing the acid from the resin by directing water into the ion exchange and through the resin;

injecting a caustic into the ion exchange and contacting the resin and converting the resin from the hydrogen form to a sodium form; and rinsing the caustic from the resin by flowing water through the resin;

recycling the backwash waste stream to the chemical softening unit.

8. The method of claim 7 wherein injecting the caustic into the ion exchange unit produces a caustic injection waste stream, and wherein when the caustic injection waste stream reaches a selected pH setpoint, the caustic injection waste stream is recycled and subjected to the processes set forth in claim 7.

* * * * *